United States Patent [19]

Hata

[11] 4,259,027

[45] * Mar. 31, 1981

[54] CONSTANT TORQUE BALL JOINT

[76] Inventor: Toshio Hata, 11-14-403, 1-chome, Denenchofu, Ohta-ku, Tokyo, Japan

[*] Notice: The portion of the term of this patent subsequent to Mar. 16, 1993, has been disclaimed.

[21] Appl. No.: 611,943

[22] Filed: Sep. 10, 1975

[30] Foreign Application Priority Data

Sep. 27, 1974 [JP] Japan .............................. 49/110620

[51] Int. Cl.³ ............................................. F16C 11/06
[52] U.S. Cl. ..................................... 403/132; 403/138
[58] Field of Search ............... 403/138, 133, 140, 132, 403/136, 135, 144

[56] References Cited

U.S. PATENT DOCUMENTS

| | | |
|---|---|---|
| 2,424,455 | 7/1947 | Graham et al. ....................... 403/132 |
| 2,855,232 | 10/1958 | Kozak .................................. 403/132 |
| 3,007,728 | 11/1961 | Hoffman .............................. 403/132 |
| 3,282,602 | 11/1966 | Willingshofer et al. ............... 403/76 |
| 3,362,735 | 1/1968 | Maxeiner ............................. 403/132 |

FOREIGN PATENT DOCUMENTS

| | | |
|---|---|---|
| 661986 | 7/1938 | Fed. Rep. of Germany ........... 403/132 |
| 848899 | 9/1960 | United Kingdom ..................... 403/132 |

OTHER PUBLICATIONS

Applicants Copending Application Serial No. 485,039 Filed 7/1/1974 and the claimed subject matter therein.

Primary Examiner—Andrew V. Kundrat
Attorney, Agent, or Firm—Fred Philpitt

[57] ABSTRACT

A constant torque ball joint employs upper and lower bearing cup pieces made of a self-lubricating material to journal the ball portion of a ball stud with their segmental spherical internal surfaces and also employs a lower elastic material block having a longitudinal elastic modulus Eo of 1.5 to 10 kg/mm² to substantially enclose tightly the outer surface of the upper and lower bearing cup pieces. The upper and lower bearing cup pieces and the lower elastic block with the ball portion of the ball stud are mounted whereby a small space is left between the upper and lower bearing cup pieces which are inserted in the socket cavity of a metallic socket joint rod. A metallic cover disc is applied over these inserted members and the end rim of the socket cavity is swaged to crimp the cover disc to substantially completely enclose the bearing cup pieces and the elastic block within the socket cavity and the cover disc. The elastic block is compressed upon assembly at an elastic compression rate of 20% or less.

1 Claim, 4 Drawing Figures

CONSTANT TORQUE BALL JOINT

BACKGROUND OF THE INVENTION

One of the most important requirements of a ball joint, especially those used in automotive steering links and automotive suspension systems, is to maintain for a long service life a certain optimum rotating torque value and a certain optimum swivelling torque value.

However, in practice, due to the inevitably developing wear in the bearing members as the operating hours or the total mileage increases, the value of the bearing contact load decreases, and consequently the rotating and swivelling torque values are reduced, and the steering wheel play as well as the oscillation increases. In order to overcome the defect of the reduction of bearing contact load value as mentioned above in conventional ball joint design, a coil spring is disposed in the space formed by the socket cavity of a metallic socket joint rod and a metallic cover disc, or a plastic bearing block is forced into the space formed by the socket cavity of a metallic socket joint rod and a metallic cover disc so that the elasticity of the bearing block per se is utilized.

However, the ball joint arrangement that makes use of a coil spring is defective in that there is only a limited space to accommodate the coil spring. Further, when the apparent compressive longitudinal elastic modulus Ec is small (e.g. Ec=0.8 kg/mm$^2$), the torque value cannot be set sufficiently high to meet the requirement of optimum rotating and swivelling torque values. Similarly, the ball joint arrangement that makes use of the elasticity of a plastic bearing block per se is also defective in that its compressive longitudinal elastic modulus Ep is too large (e.g., Ep=50 kg/mm$^2$ for high density polyethylene). Not only is there a large reduction of bearing contact load value even with a small change of its dimensions due to the abrasion that accompanies a large reduction of rotating and swivelling torque values, but also, in the production process of a ball joint with a small deviation of the dimensions in the relevant members, there results in a large deviation of the initially set rotating and swivelling torque values. Therefore under such circumstances, ball joints can hardly be quantity-produced with a uniform torque value.

SUMMARY OF THE INVENTION

In a ball joint based on the present invention, the ball portion of a ball stud is journalled between upper and lower bearing cup pieces, each of which has segmental spherical internal surface made of a solid self-lubricating material such as a plastic material like polyacetal or a metal like iron or copper-based sintered alloys. Then, the bearing cup pieces are totally or partly externally covered by an elastic block having a compressive longitudinal elastic modulus Eo=1.5 to 10 kg/mm$^2$. Finally, the upper and lower bearing cup pieces and the lower elastic block are substantially enclosed in a socket cavity of a metallic socket joint rod and a metallic cover plate. Thus, the elastic block is elastically compressed within a compression rate of 20% resulting in optimum rotating and swivelling torque values that are required of the instant ball joint. When a compression rate of the elastic block and its compressive longitudinal elastic module is selected at values as mentioned above, the internal energy of the compressive elastic block is made to discharge towards the center of the ball of the ball stud whereby all reduction in bearing surface contact load value due to an abrasion in the contact surface between the ball surface of the ball stud and the segmental spherical surfaces of the bearing cup pieces is compensated. Consequently, under such circumstances, all reduction of rotating and swivelling torques of the instant ball joint type is prevented.

Furthermore, with proper selections of the elastic compression rate, compressive longitudinal elastic modulus, and size-shape of elastic block, the rotating and swivelling torques can be set at the desired values for the instant ball joint.

Although the principle of the present invention is generally applicable to various joints and to various bearings, the embodiment described herein is specifically applicable to an automotive steering ball joint.

For a better understanding of the present invention, several representative industrial materials are reviewed as to their longitudinal elastic modulus (including their apparent longitudinal elastic modulus).

Steel—21,000 kg/mm$^2$
Phenol resin—1,000 kg/mm$^2$
Polyacetal resin—300 kg/mm$^2$
High density polyethylene—50 kg/mm$^2$
Coil spring—1 kg/mm$^2$
Rubber—0.5 kg/mm$^2$ The compressive longitudinal elastic modulus that is required in the present invention is:

$$Eo = 1.5 \text{ to } 10 \text{ kg/mm}^2$$

As for an elastic material having a compressive longitudinal elastic modulus Eo is this range, there are commercially available the M type polyurethane elastomer of Elastomer Technical Institute, or the combined H type Belleville spring of Iwata Denko Co., Ltd. For the application of the present invention, an elastic compression rate of 20% or less is suitable.

DESCRIPTION OF THE PREFERRED EMBODIMENT OF THE INVENTION

Figure 1:
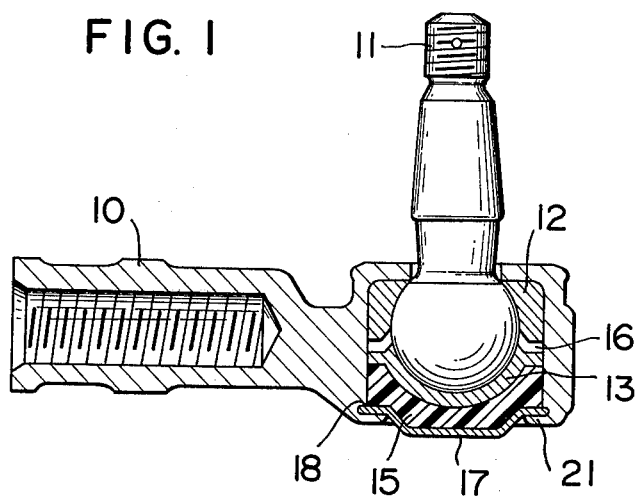
FIG. 1 is a sectional view of an embodiment of the present invention taken along the axial plane.

A detailed description of the preferred embodiment of the present invention follows. FIG. 1 is a sectional view of a ball joint as applied to an automotive steering link, taken along a plane passing through the ball center. A metallic socket joint rod is generally indicated by a numeral 10. The rod 10 is provided with a bearing shell which includes first and second openings. In the socket cavity of the bearing shell of the socket joint rod 10, there is disposed the ball portion of a metallic ball stud 11. The ball portion is journalled in an upper bearing piece 12 and a lower bearing cup piece 13. Tightly interposed between the bearing shell and the upper and lower bearing cup pieces is an elastic block means. The elastic block means is a lower elastic block 15 made of polyurethane having a compressive longitudinal elastic modulus E of 4.1 kg/mm$^2$. The shank portion of the ball stud 11 extends through the first opening of the bearing shell as well as through an opening of the upper bearing piece 12. Each of the cup pieces 12, 13 is made of polyacetal plastic and the internal surfaces thereof have segmental spherical shapes. The lower elastic block 15 is mounted to be compressed against the lower bearing cup piece 13. An abrasion displacement allowance space 16 is formed between the upper bearing piece 12 and the lower bearing cup piece 13. A metallic cover disc 17 closes the second opening of the bearing shell and tightly compresses the adjacent lower elastic block 15. The space 16 is provided for the purpose of allowing the upper and lower bearing cup pieces 12, 13 to shift towards the ball center of the ball stud 11 to compensate for possible surface abrasion that takes place in the contact surfaces between the upper and lower bearing cup pieces 12, 13 and the ball stud 11. The space is lubricated either by grease or solid lubricant, whereby the compensation is made at the expense of the discharge of the elastic compressive internal energy that is stored in the lower elastic block 15.

Generally, when a bearing contact surface load is applied to a ball joint used in an automotive steering system by the application of a backup elastic compressive block, a value in the neighborhood of 50 kg is appropriate. In such a ball joint, when grease is used as lubricant, a friction coefficient is assumed to be in the neighborhood of 0.1. Therefore, in order to maintain the rotating torque and the swivelling torque at a respective constant value, it is suffice that the bearing contact load be maintained at a constant level. However, in practice, because the bearing contact surfaces are subject to unavoidable abrasion effect the bearing contact surface load that is applied by the compressive elastic block is subject to an unavoidable decrease of value due to this change of position caused by abrasion. In order to minimize such a decrease of value in the bearing contact surface load, it is sufficient that the compressive longitudinal elastic modulus of the compressive elastic block be minimized.

On the other hand, the amount of space which is permitted in an elastic block arrangement in the socket cavity of a metallic socket joint rod that is to be used in an ordinary automotive steering system is limited. Therefore, if the compressive longitudinal elastic modulus of the elastic block is to small, it becomes impossible to achieve the required bearing contact surface load value Pv (e.g. Pv=50 kg).

From the above conditions it follows that for a ball joint to be useful automotive steering system, the preferred range of values of the longitudinal elastic modulus Eo of the backup compressive elastic block is 1.5 to 10 kg/mm$^2$.

Figure 2:
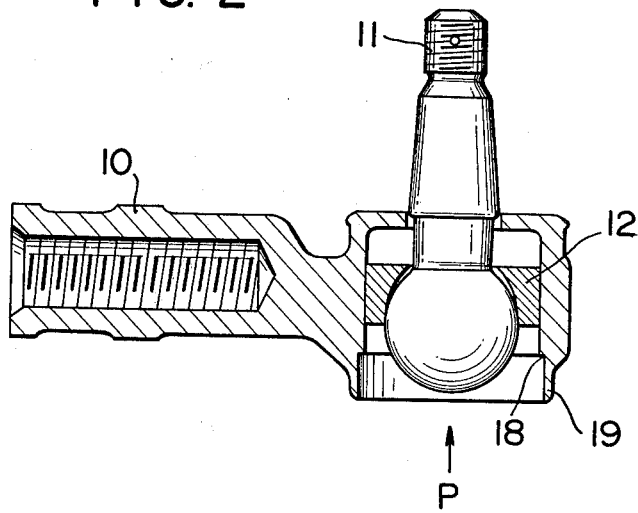
FIGS. 2 through 4 are sectional views corresponding to FIG. 1.
Figure 3:
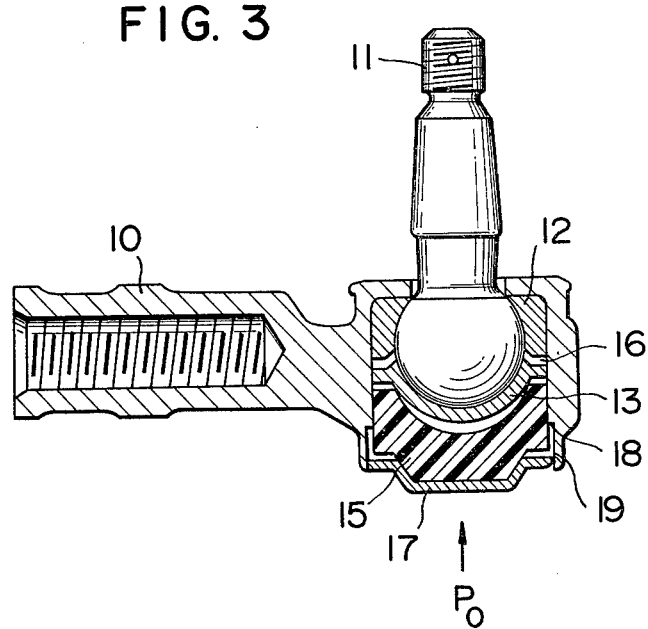

The assembly method of a ball joint based on the present invention now follows to assist in an understanding of the invention: As shown in FIG. 2, in the socket cavity of a metalic socket joint rod 10, first, an upper bearing piece 12 made of polyacetal plastic in the shape having a semi-spherical cavity surface is inserted. Secondly, a metallic ball stud 11 is inserted, with the application of an axial force P. Thirdly, as shown in FIG. 3, a lower bearing cup piece 13 made of polyacetal plastic in the form having a semi-spherical cavity is inserted in the socket cavity of the metallic socket joint rod. Fourthly, a lower elastic block 15 made of polyurethane plastic having a compressive longitudinal elastic modulus E of 4.1 kg/mm$^2$ designed to result in an optimum rotating and swivelling torque values upon assembly is pushed in. Fifthly, a metallic cover disc 17 is forced over all these members at a load of Po in the direction of the ball stud axis. In order to result in optimum rotating and swivelling torque values upon assembly, there is provided near the rim of the socket opening of the metallic joint socket rod 10 a shoulder 18 at which the metallic cover disc compresses the lower elastic block 15 to its predetermined compressive elastic deformation. Therefore when the cover disc 17 is forced to the position of the shoulder 18, optimum rotating and swivelling torque values are secured.

Figure 4:
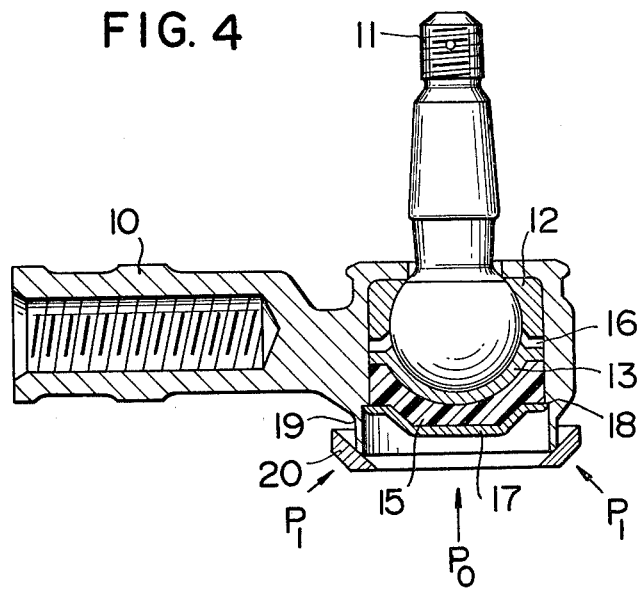

Finally, as shown in FIG. 4, after forcing the cover disc 17 to the position of the shoulder 18, a tool 20 is applied on the socket rim portion 19 of the metallic socket joint rod 10 in the $P_1$ direction at a force $P_1$ to swage the rim end portion of the socket opening into the shoulder form 21 shown in FIG. 1.

A typical prior art ball joint arrangement may provide the ball portion of a ball stud to be supported between an upper and a lower bearing pieces having semi-spherical cavity surfaces and the upper bearing piece to be made of a hard high-molecular polymer such as nylon, and the lower bearing cup piece to be made of a soft flexible material such as polyurethane or lubricant-impregnated rubber. These two bearing cup pieces are then inserted in the socket cavity of a joint socket rod and enclosed therein wiht a cover disc with the lower bearing cup piece kept in an elastically compressed condition. This prior art arrangement is to be contrasted with a ball joint based on the present invention wherein the ball portion of a ball stud is positioned firstly between an upper and a lower bearing cup pieces made of a solid material having self-lubricating property in a form having a semi-spherical cavity surface, then secondly, the lower bearing piece is covered by a lower elastically compressed elastic block, and thirdly, all these members are substantially completely enclosed in the socket cavity of a metallic socket joint rod by means of a metallic cover disc.

The reasons for providing two bearing cup pieces and one backup elastic block is as follows:

The principal factors that determine the optimum rotating and swivelling torque values in a ball joint based on the present invention are the friction coefficient between the bearing frictional contact surfaces, the ball stud configuration, and the bearing frictional contact surface load value. Of these factors, while friction coefficient and configuration are expected to remain almost unchanged, the load value is subjected to a reduction due to an unavoidable abrasion shift developing in the bearing friction contact surface and a plastic deformation shift of the members in the ball socket joint cavity.

It follows therefore, in order to maintain rotating and swivelling torques at their respective optimum values, a material must be utilized that possesses simultaneously the best bearing characteristic of the smallest friction, and the best elastic characteristic of the smallest compressive longitudinal elastic modulus and the largest compressive elastic limit. To satisfy these three characteristics in one material is next to impossible.

Therefore in the present invention, the selection of the proper materials is made easy through an arrangement which has departed from conventional arrangements in such a way that the bearing member is divided into a bearing piece proper made of friction resistant and highly lubricant material, and an elastic block that is suited to develop an optimum rotating and an optimum swivelling torque. Thus, each member is required to only satisfy its own functional requirement.

In the arrangement described above, the optimum rotating and swivelling torque values are maintained by the elastic deformation stress in the lower elastic block that encloses the bearing piece. In the present invention, the compressive longitudinal elastic modulus of the elastic block enclosing the lower bearing cup piece is selected at a value Eo of 1.5 to 10 kg/mm² which is substantially lower than conventionally adopted values. Accordingly, there is only a minimum of reduction in the deformation stress due to an elastic restoration of the backup elastic block at an abrasion shift of the bearing cup pieces. Furthermore, even when the bearing piece should develop abrasion to some extent, because there is a space provided between the upper and lower bearing cup pieces, substantially all the abrasion shift can be taken up as a reduction of the space, without any substantial reduction in the contact load in the bearing surface. Furthermore because the materials used have substantially higher longitudinal elastic modulus than coil springs, a sufficiently high torque value can be obtained in a socket having a small space.

Furthermore, because the elastic block in the present invention is designed to be compressed up to a limit of elastic compression rate of 20% other members in the ball socket joint cavity are not plastic deformed, but still there is a sufficient elastic restoration potential exceeding any potential practical abrasion shift.

When a ball joint based on the teachings of the present invention is composed of members made of materials having the abovementioned characteristics, when all possible reduction of load is made between the upper and lower bearing contact surfaces due to the abrasion shift produced in the contact surfaces between the upper and lower bearing cup pieces and when the ball surface of a ball stud is recovered by the release of the elastic compression internal energy stored in the elastic block, it is then possible that the ball joint will maintain optimum rotating and swivelling torques throughout a long period of operation.

The invention has been described in the detail with particular reference to the preferred embodiment thereof, but is will be understood that variations and modifications can be effected within the spirit and scope of the invention.

What is claimed is:

1. A constant torque ball joint, especially applicable as an automotive steering ball joint, consisting of:
   (a) a socket joint rod means having a bearing shell at one end, said shell including a socket cavity and first and second openings and having shoulder means adjacent said second opening,
   (b) a ball stud member having a ball head portion positioned in a spaced relation in said socket cavity and having a shank portion connected to said ball head portion and extending through said first opening;
   (c) upper and lower segmental spherical bearing cup pieces being made of a self-lubricating material and mounted to provide a spacing between said bearing cup pieces; said ball head portion being journalled in said bearing cup pieces;
   (d) elastic block means having a segmental spherical surface and being made of an elastic material having a longitudinal elastic modulus Eo of 1.5 to 10 kg/mm² and being tightly interposed between said bearing shell and said lower segmental bearing cup piece, said elastic block means being mounted in a compressed relationship with its segmental spherical surface against the lower bearing cup piece, said elastic block being compressed upon assembly at an elastic compression rate of 20% or less; and
   (e) a cover disc closing said second opening and being tightly secured against said shoulder means of said bearing shell.

* * * * *

UNITED STATES PATENT OFFICE
CERTIFICATE OF CORRECTION

PATENT NO. : 4,259,027
DATED : March 31, 1981
INVENTOR(S) : TOSHIO HATA

It is certified that error appears in the above-identified patent and that said Letters Patent are hereby corrected as shown below:

After the inventors name add:

[73] KOYO AUTO-MECH CO., LTD, Japan

Signed and Sealed this

Fourteenth Day of July 1981

[SEAL]

Attest:

GERALD J. MOSSINGHOFF

Attesting Officer

Commissioner of Patents and Trademarks